May 5, 1964 A. D. WOLFHEIMER 3,132,241

BADGE-READING APPARATUS

Filed July 18, 1960 2 Sheets-Sheet 1

INVENTOR
ALBERT D. WOLFHEIMER

BY [signature]
AGENT

May 5, 1964

A. D. WOLFHEIMER 3,132,241

BADGE-READING APPARATUS

Filed July 18, 1960

2 Sheets-Sheet 2

United States Patent Office 3,132,241
Patented May 5, 1964

3,132,241

BADGE-READING APPARATUS

Albert D. Wolfheimer, Endwell, N.Y., assignor to International Business Machines Corporation, New York, N.Y., a corporation of New York Filed July 18, 1960, Ser. No. 43,378
3 Claims. (Cl. 235—61.11)

This invention relates to a novel badge-reading apparatus and more particularly relates to an apparatus for reading encoded data, character by character, from a badge.

Prior to data processing operations, it is necessary to introduce data which is to be processed into the data processing system. The employment of punched cards of the IBM type as an input means of source data for data processing systems is well known. There is at the present time a need for a practical form of apparatus which will enable the reading of character data from a badge and for causing such source data to be entered into data processing systems.

Accordingly, it is a principal object of the invention to provide a badge-reading apparatus which is positive in its operation and simple in construction and can read a badge character by character while the badge remains in a reading position.

Another object of the invention is to provide an improved sensing means for sensing a badge, character by character, which sensing means includes a plurality of slider sensing assemblies, one for each possible character position on a badge, and includes control means to render the sensing assembly effective to sense one column of character data at a time in sequence.

A further object of the invention is to provide a badge-reading apparatus which includes a sensing means having a simplified and novel switching arrangement for translating movement of the sensing means into electrical signals corresponding to the data characters which are sensed.

Another object of the invention is to provide a sensing means for sensing data characters column by column on a badge during the time the badge is in a reading station and to provide control means for releasing the badge from the reading position after the badge has been sensed.

Briefly, the badge-reading apparatus constructed in accordance with the invention comprises provisions for inserting a badge into a badge-reading apparatus, means to sense data codally stored in the badge by means of selectively positioned holes occurring in the badge, circuit connecting means controlled by the badge sensing means whereby the circuits can be selectively scanned to enable a readout of the data stored in the badge.

The foregoing and other objects, features and advantages of the invention will be apparent from the following more particular description of a preferred embodiment of the invention, as illustrated in the accompanying drawings.

*General Description*

The instant invention concerns a novel badge-reading apparatus capable of reading a badge, column by column, in sequence while the badge remains locked in the reading position. The badge-reading apparatus is provided with a badge receiver into which badges can be inserted manually one at a time.

The badge which is to be read by the reading apparatus of the instant embodiment of the invention is capable of storing ten characters of data. A portion of the badge is subdivided into vertical columns and horizontal rows or index point positions. Data is recorded in the badge by means of selectively punched holes in index positions of the columns of the badge.

The badge sensing mechanism comprises a plurality of slider assemblies, one for each vertical column of the badge. As a badge is inserted into the badge receiver, a hole sensing projection on each of the slider assemblies senses for a hole in a corresponding column of the badge. As a hole sensing projection encounters a hole in the badge, the slider assembly will move with the badge until the badge is stopped in its fully inserted or badge-reading position. A latch mechanism serves to lock the badge in the reading position. The badge reader includes two arrays of electrical conductors. One array has a plurality of conductive elements arranged in parallel and corresponding to the data columns of the badge which are referred to as column commons. The other conductor array has a plurality of conductive elements, one for each of the digits 0 through 9, arranged in parallel and disposed at right angles with respect to the column commons. Bifurcated contacts affixed to each of the slider assemblies serve to make electrical connections between the column commons and the digit common in accordance with the data of the badge sensed by the hole sensing projections of the slider assemblies as a badge is being inserted into the badge reader.

The operation of the badge-reading apparatus will be clear from the following detailed description.

*Detailed Description—Badge-Reading Apparatus*

While the badge-reading apparatus of the instant embodiment of the invention has a capacity for reading up to ten columns on a badge, it will be obvious from the following description that the capacity of the badge-reading apparatus is merely exemplary and that the capacity can be varied without departing from the invention.

Figures 1, 2:
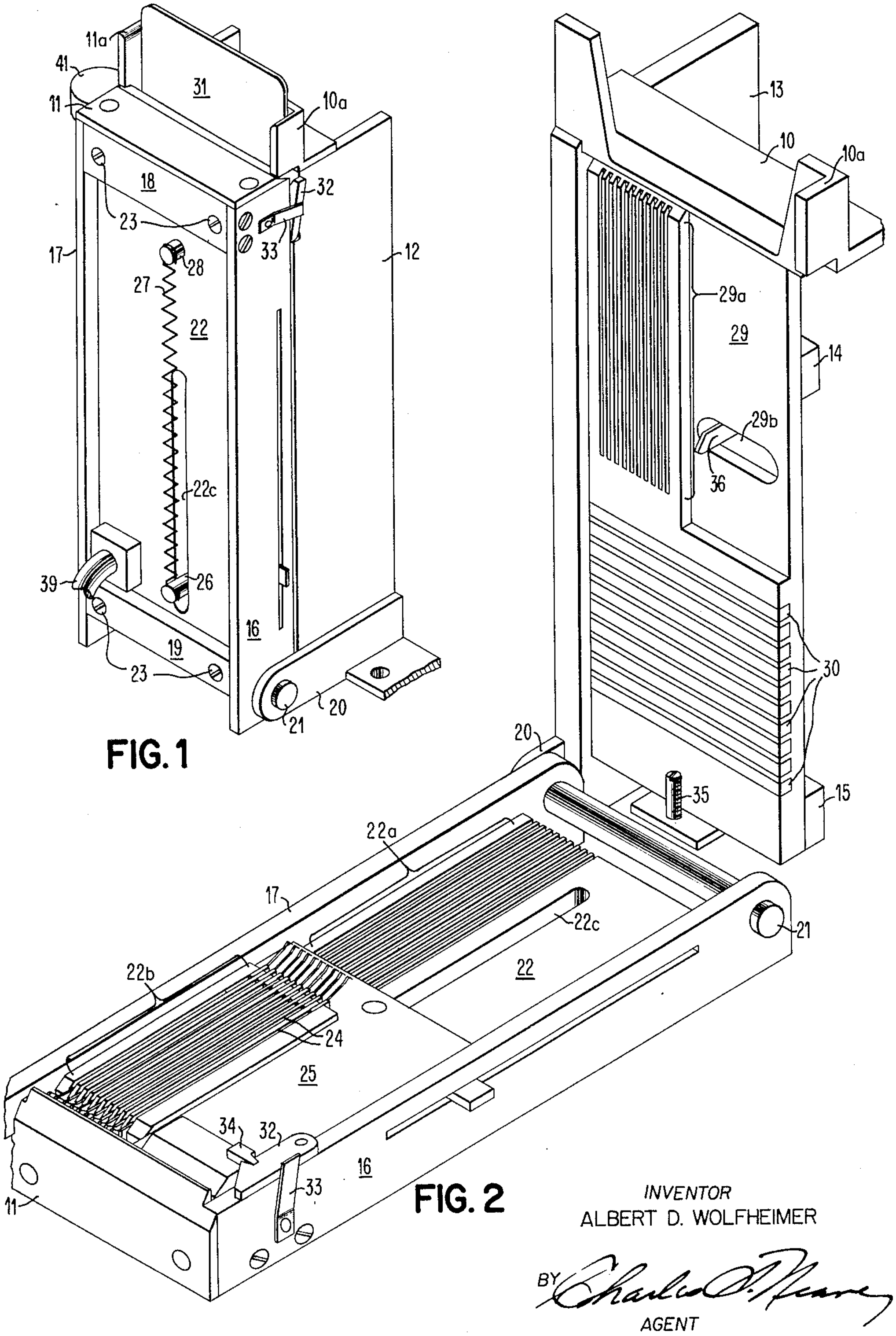
FIG. 1 is a perspective view of the badge-reading apparatus showing a badge in the badge receiver.
FIG. 2 is a perspective view of the badge-reading apparatus in an opened position.

As shown in FIGS. 1 and 2, the badge-reading apparatus is provided with a receiver for receiving badges that are to be read. A receiver throat is formed by a rear guide member 10 and right side guide 10*a*, a front guide member 11 and left side guide 11*a*. The rear guide member 10 is cut away in the central portion to enable the badges to be fully inserted into the badge receiver. The upper ends of the side guides 10*a* and 11*a* are rounded to facilitate the placing of the badges into the badge receiver.

The right rear side frame 12 and left rear side frame 13 are held in parallel spaced apart relationship by means of the support bars 14 and 15. The rear guide member 10 is fixed to the rear side frames 12 and 13. The right front side frame 16 and left front side frame 17 are held in parallel spaced apart relationship by means of the support bars 18 and 19. The front guide member 11 is fixed to the front side frames 16 and 17. The front frame assembly is hinged to the rear frame assembly by means of the hinge plates 20 and shaft 21.

The front plate 22 is held in fixed relationship by means of the screws 23. Front plate 22 is made of dielectric material. The lower portion 22*a* of the front plate 22 has ten guide slots. Embedded in back of the guide slots is a column commons conductive array comprising ten vertically disposed conductor elements, one for each of the corresponding data columns of the badge. The upper portion 22*b*, of front plate 22 is raised and contains ten guide grooves adapted to accommodate the slider assemblies 24 (see FIG. 3) one for each of the corresponding data columns of the badge. The badge abutment plate 25 is slideably mounted in the front frame assembly and has a pin 26 that projects through the slot 22*c* in front plate 22. The badge abutment plate 25 is biased and in an upward direction by means of spring 27 that is attached to pin 28 which is fixed to front plate 22.

The rear plate 29 is attached to support bars 14 and 15. Rear plate 29 is made of dielectric material. Rear plate 29 has an upper portion 29*a* having ten slider guide grooves which function to guide the slider assemblies 24. The lower portion of rear plate 29 has embeded therein a digit commons conductive array comprising ten horizontally disposed conductor elements 30, one for each of the digits 0 through 9, otherwise referred to as digit commons.

Figures 3, 4, 5:
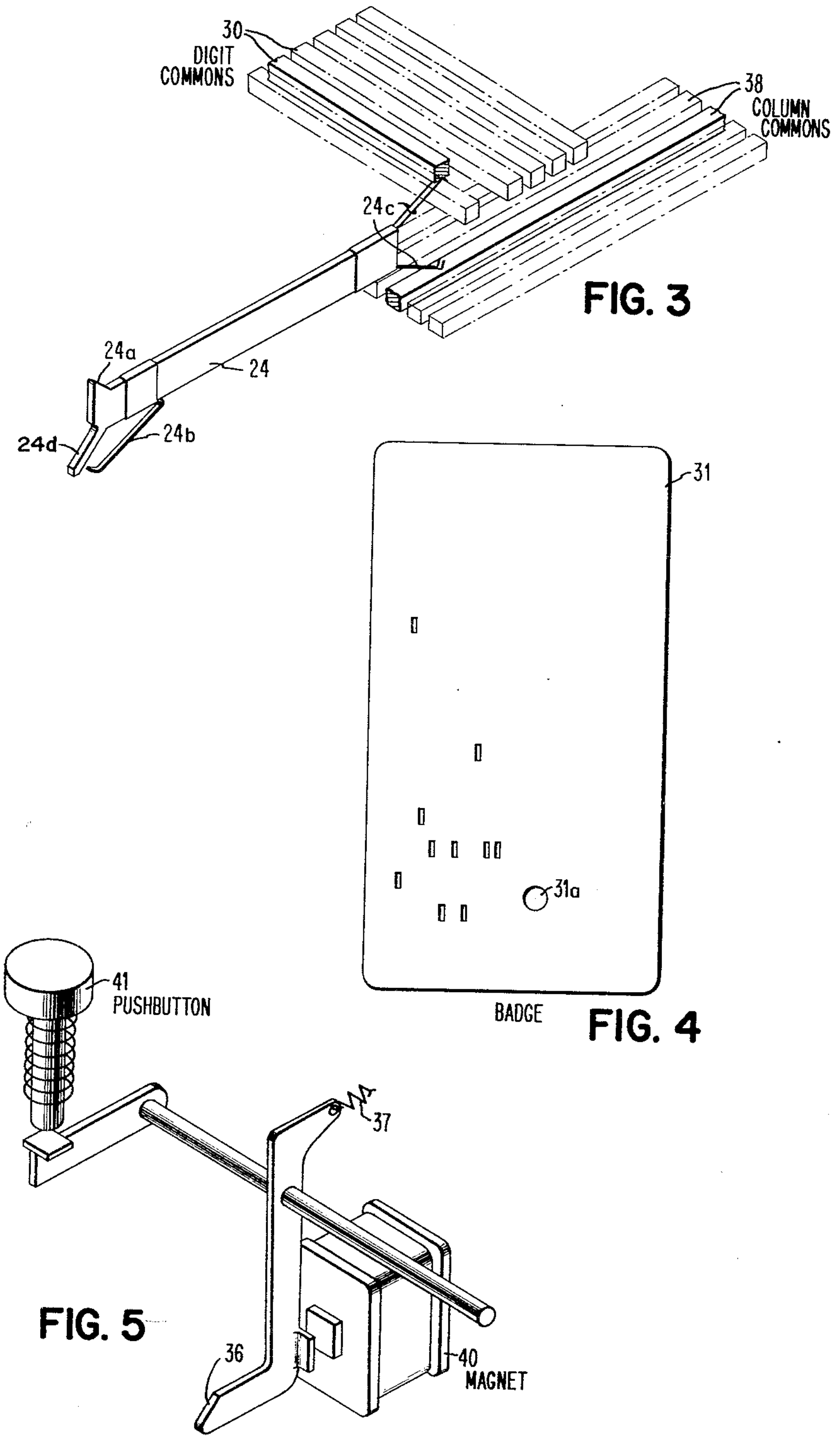
FIG. 3 is an exploded perspective view of the column commons conductor array, the digit commons conductor array and slider assembly.
FIG. 4 is a facsimile showing of a typical badge which may be read by the badge-reading apparatus.
FIG. 5 is a schematic showing of the badge latching mechanism.

Referring to FIG. 3, the slider assembly 24 is shown to be comprised of a hole sensing projection 24*a*, a spring 24*b*, a cam projection 24*d* and the bifurcated contacts 24*c*. Referring to FIG. 2, when there is no badge in the receiver and the badge abutment plate 25 is in its uppermost position, cam projection 24*d* will coact with a cam surface on the bottom side of front guide member 11 so as to move the upper end of slider assembly 24 towards the front of the badge reader and into a recess and thereby remove the hole sensing projections 24*a* out of the badge receiving path.

As the badge 31 is introduced into the badge receiver of the badge reading apparatus, the right-hand edge will strike detent 32 which is pivotally mounted on right front side frame 16, forcing it outwards, by overcoming the pressure of spring 33. Continued downward movement of the badge will cause the bottom edge of the badge 31 to strike the abutment member 34 which is fastened to the abutment plate 25, thereby moving the abutment plate 25 in the downward direction. The downward movement of abutment plate 25 releases its holding pressure on the slider assemblies 24. The pressure of springs 24*b* will urge the badge sensing projections 24*a* into contact with the surface of the badge 31. With the continued downward movement of the badge 31, the ten sensing projections 24*a* will sense for character representing holes in the badge 31. Upon encountering a hole, the sensing projection 24*a* will be urged into the hole due to the pressure of spring 24*b*. With the continued downward movement of the badge 31 and as the sensing projections 24*a* encounter a character representing hole, the slider assemblies 24 will be likewise moved in a downward direction within their guide groves until such time that the abutment plate 25 strikes the stop screw 35. As the badge 31 approaches its bottommost position within the badge receiver, the lower edge of the badge 31 will strike the latch lever 36 (see FIGS. 2 and 5), which protrudes through the opening 29*b* in the rear plate 29, camming it in an outward direction against the tension of spring 37. With the badge 31 reaching its bottommost position within the badge receiver, the latch lever 36 will enter the latch hole 31*a* (see FIG. 4), thereby latching the badge 31 in the reading position. The badge 31 in being fully inserted into the badge receiver of the badge-reading apparatus will have moved the slider assemblies 24 to a position which is in accordance with the data codally stored in the badge 31.

Referring to FIG. 3, the bifurcated spring contacts 24*c* serve to electrically connect the column commons 38 with one of the digit commons 30 in accordance with the character representations in the badge 31 as sensed by the sensing projections 24*a*. Under the control of programming equipment (not shown) and connected to the badge-reading apparatus by means of the electrical cable 39 (FIG. 1), the column commons 38 may be selectively energized in sequence. In accordance with the electrical circuits completed by the bifurcated spring contacts 24*c*, the character representing signals occurring on the digit commons 38 can be electrically connected to other data storing media (not shown).

After the reading of the badge 31, the badge 31 may be electromagnetically released by electrically energizing the electromagnet 40 which causes the latch lever 36 to be withdrawn from the latch hole 31*a* in the badge 31. There is also provision for the manual release of the badge 31 from the badge reading position which can be accomplished by actuation of the manual release push button 41 that will also cause the latch lever 36 to be withdrawn from the latch hole 31*a* in the badge 31. When the latch lever 36 is withdrawn from the latch hole 31*a*, the badge 31 will be ejected from the badge receiver through the action of spring 27 which causes the abutment plate 25 to be restored to its uppermost slideable position. In returning to its uppermost position, the abutment plate 25 will carry with it the slider assemblies 24. With the abutment plate 25 in its uppermost position, the detent 32 will engage the abutment member 34 latching it in the restored position. The badge-reading apparatus is now in condition to receive the next badge that is to be read.

It is believed that the badge-reading apparatus and its operation will be clear from the above description.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus for reading badges on which data is recorded by perforations in any of a plurality of data representing positions in a plurality of columns, the combination of badge receiving means; a plurality of slider assemblies, one for each data representing column on a badge, having a badge sensing projection, a spring for biasing said slider assembly so that the badge sensing projection will contact the badge when it is being inserted into said badge receiving means and bifurcated electrical spring contacts; guide means for said slider assemblies; a badge abutment plate; spring means connected to said badge abutment plate for biasing said slider assemblies in an upward direction; means for latching said badge abutment plate in its uppermost position and being releasable by an insertion of a badge into said badge receiving means; an input conductive array having a plurality of vertically disposed conductive elements, one of each of the data representing columns of the badge; an output conductive array having a plurality of horizontally disposed digit representing conductive elements; circuit connections between said input and output conductive arrays made by said bifurcated electrical spring contacts in accordance with the data on the badge when the badge has been fully inserted into said badge receiving means; and mechanism for latching the badge in the reading position within said badge receiving means.

2. In an apparatus for reading badges on which data is recorded by perforations in any of a plurality of data representing positions in a plurality of columns, the combination of badge receiving means; a plurality of slider assemblies, one for each data representing column on a badge, having a badge sensing projection, a spring for biasing said slider assembly so that the badge sensing projection will contact the badge when it is being inserted into said badge receiving means, and bifurcated electrical spring contacts; guide means for said slider assemblies; a badge abutment plate; spring means connected to said badge abutment plate for biasing said slider assemblies in an upward direction; means for latching said badge abutment plate in its uppermost position and being releasable by an insertion of a badge into said badge receiving means; an input conductive array having a plurality of vertically disposed conductive elements, one for each of the data representing columns of the badge; an output conductive array having a plurality of horizontally disposed conductive elements, one for each of the digits 0 through 9; circuit connections between said input and output conductive arrays made by said bifurcated electrical spring contacts in accordance with the data on the badge when the badge has been fully inserted into said badge receiving means; mechanism for latching the badge in the reading position within said badge receiving means; and means for releasing said badge latching mechanism to cause an ejection of the badge from said badge receiving means.

3. In an apparatus for reading badges on which data is recorded by perforations in any of a plurality of data representing positions in a plurality of columns, the combination of badge receiving means; a plurality of slider assemblies, one for each data representing column on a badge, having a badge sensing projection, a spring for biasing said slider assembly so that the badge sensing projection will contact the badge when it is being inserted into said badge receiving means, and bifurcated electrical spring contacts; guide means for said slide assemblies; a badge abutment plate; spring means connected to said badge abutment plate for biasing said slider assemblies in an upward direction; means for latching said badge abutment plate in its uppermost position and being releasable by an insertion of a badge into said badge receiving means; an input conductive array having a plurality of vertically disposed conductive elements, one for each of the data representing columns of the badge; an output conductive array having a plurality of horizontally disposed conductive elements, one for each of the digits 0 through 9; circuit connections between said input and output conductive arrays made by said bifurcated electrical spring contacts in accordance with the data on the badge when the badge has been fully inserted into said badge receiving means; mechanism for latching the badge in the reading position within said badge receiving means; and electromechanical means for releasing said badge latching mechanism after a badge reading operation to enable an ejection of the badge from said badge receiving means by said badge abutment plate.

References Cited in the file of this patent

UNITED STATES PATENTS 2,072,447 Gray ------------------ Mar. 2, 1937